UNITED STATES PATENT OFFICE.

CARL F. L. LIMPACH, OF HÖCHST-ON-THE-MAIN, GERMANY, ASSIGNOR TO FARBWERKE, VORMALS MEISTER, LUCIUS & BRÜNING, OF SAME PLACE.

MANUFACTURE OF COLORING-MATTER.

SPECIFICATION forming part of Letters Patent No. 268,507, dated December 5, 1882.

Application filed June 22, 1882. (No specimens.) Patented in France May 27, 1882, No. 137,109, and in England May 30, 1882, No. 2,544.

*To all whom it may concern:*

Be it known that I, CARL FRIEDRICH LEONHARD LIMPACH, Doctor of Philosophy, of Höchst-on-the-Main, Germany, have invented certain new and useful Improvements in Coloring-Matters; and I do hereby declare that the following is a full, clear, and exact description of the invention, which will enable others skilled in the art to which it appertains to make and use the same.

The object of my invention is the production of a bluish-red coloring-matter by acting with the sodium salt of the beta-naphthol trisulphonic acid upon the diazo compound derived from the amidoazo-benzole.

In order to produce the trisulphonic acid of beta-naphthol discovered by me I add one part of naphthol to from four to five parts of fuming sulphuric acid (containing twenty per cent. $SO_3$) in such a manner that the temperature of the mixture rises up to 284°–320° Fahrenheit, (140°–160° centigrade.) I allow the action to proceed at this temperature until a sample of the product gives, with ammonia, a solution showing a pure green fluorescence and produces a coloring-matter on being left standing with diazoxylol in an alkaline solution. This point having been reached, the mass is in the usual manner converted into the sodium salt of the trisulphonic acid of beta-naphthol.

In producing the coloring-matter I thoroughly mix 19.7 parts of amidoazo-benzole, twenty-five parts of muriatic acid, (containing thirty-three per cent. HCe,) and two hundred and fifty parts of water, and to this I add 6.9 parts of nitrite of sodium dissolved in twenty parts of water, all the while taking care to keep the temperature below 41° Fahrenheit, (5° centigrade.) When, after a sufficient length of time, the diazo compound has formed, its solution is introduced into a solution of fifty parts of the sodium salt of the beta-naphthol trisulphonic acid in two hundred and fifty parts of water, to which ten parts of aqueous ammonia (containing twenty-four per cent. $NH_3$) are added. The greatest part of the coloring-matter separates in form of a voluminous precipitate, which is purified by dissolving it in water and precipitating it by means of common salt.

By dissolving the coloring-matter in concentrated sulphuric acid a solution of violet shade is obtained, which after standing for some time turns bluish.

When boiled with tin and muriatic acid the coloring-matter is destroyed.

What I claim as new, and wish to secure by Letters Patent, is—

The bluish-red coloring-matter, as a new manufacture, produced by the action of the diazo compound of the amidoazo-benzole upon an alkaline solution of trisulphonic acid of beta-naphthol, or by any other means that will produce a like result.

In testimony that I claim the foregoing as my own I affix my signature in presence of two witnesses.

CARL FRIEDRICH LEONHARD LIMPACH.

Witnesses:
F. VOGELER,
A. S. HOGUE.